July 3, 1956  R. C. ZEIDLER  2,752,859
FLUID COUPLING ELEMENT
Filed Aug. 19, 1949  3 Sheets-Sheet 2
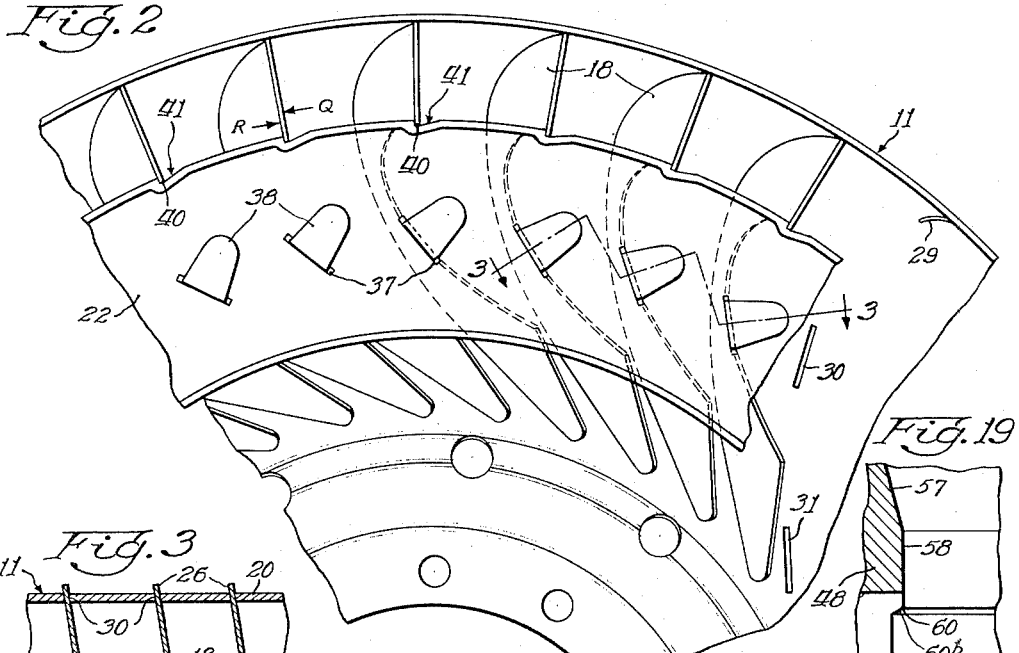
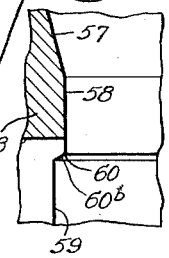
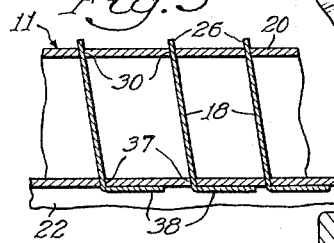
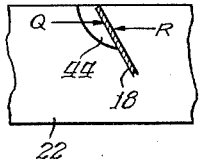
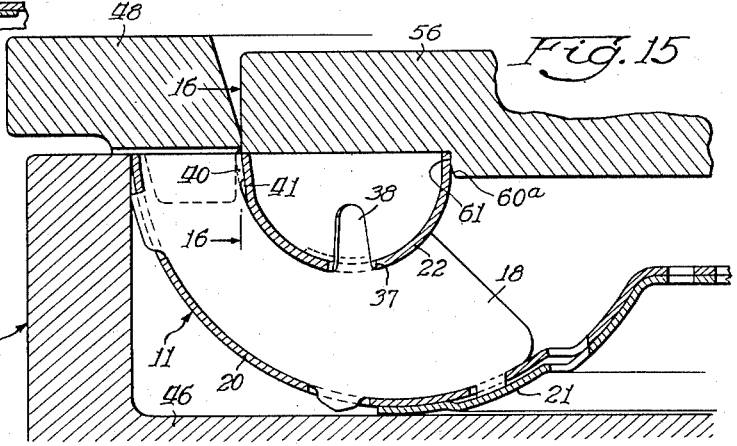
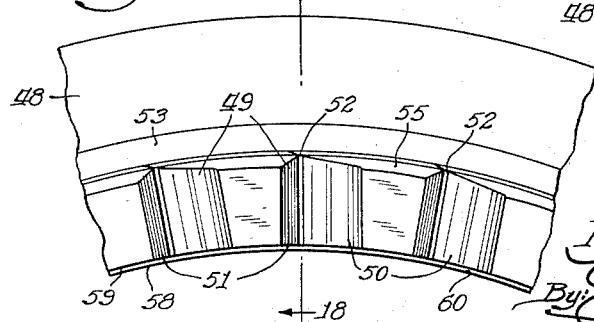
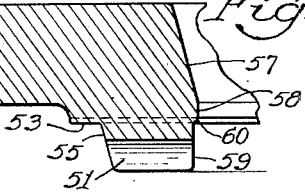
Inventor:
Reinhold C. Zeidler

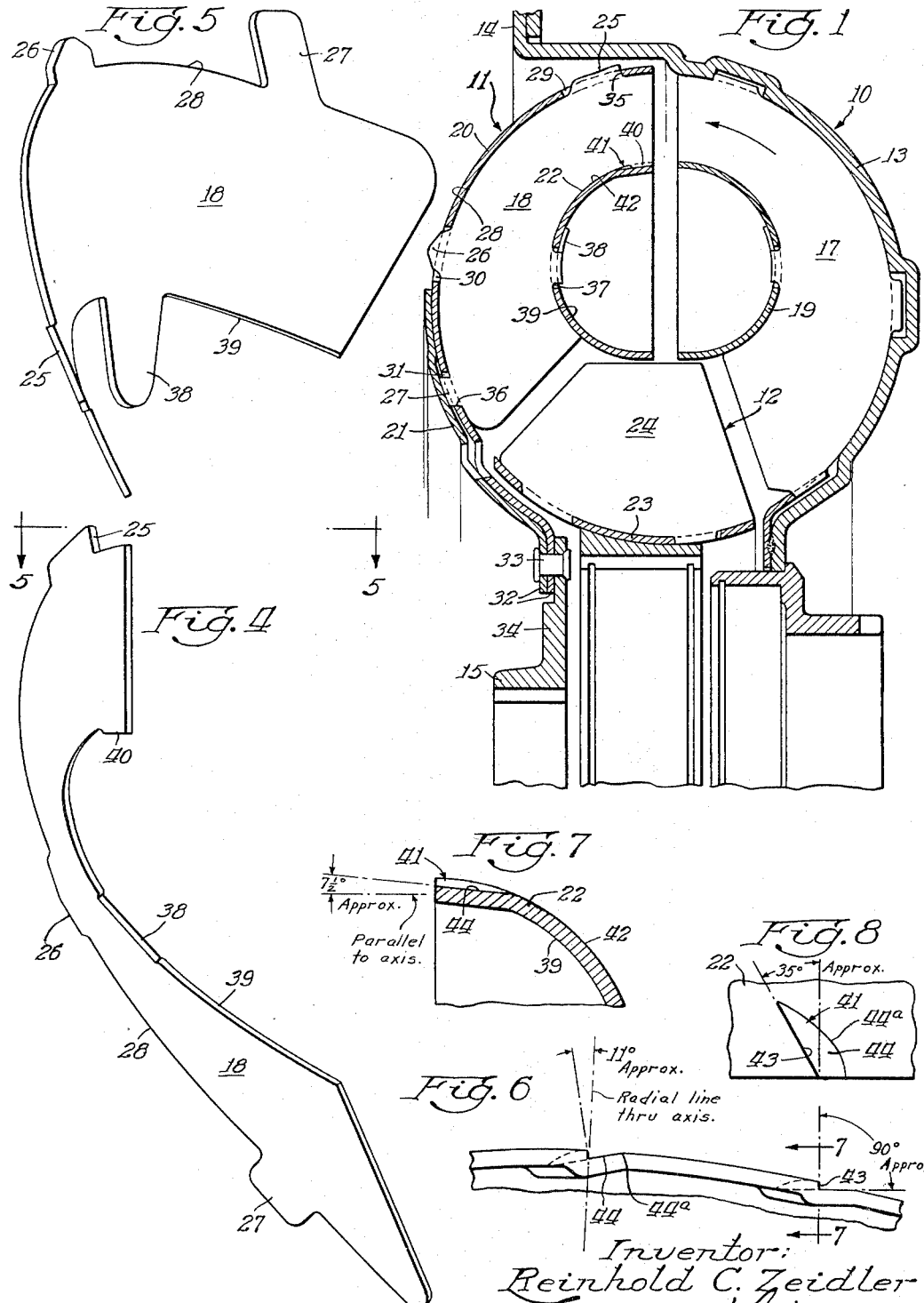

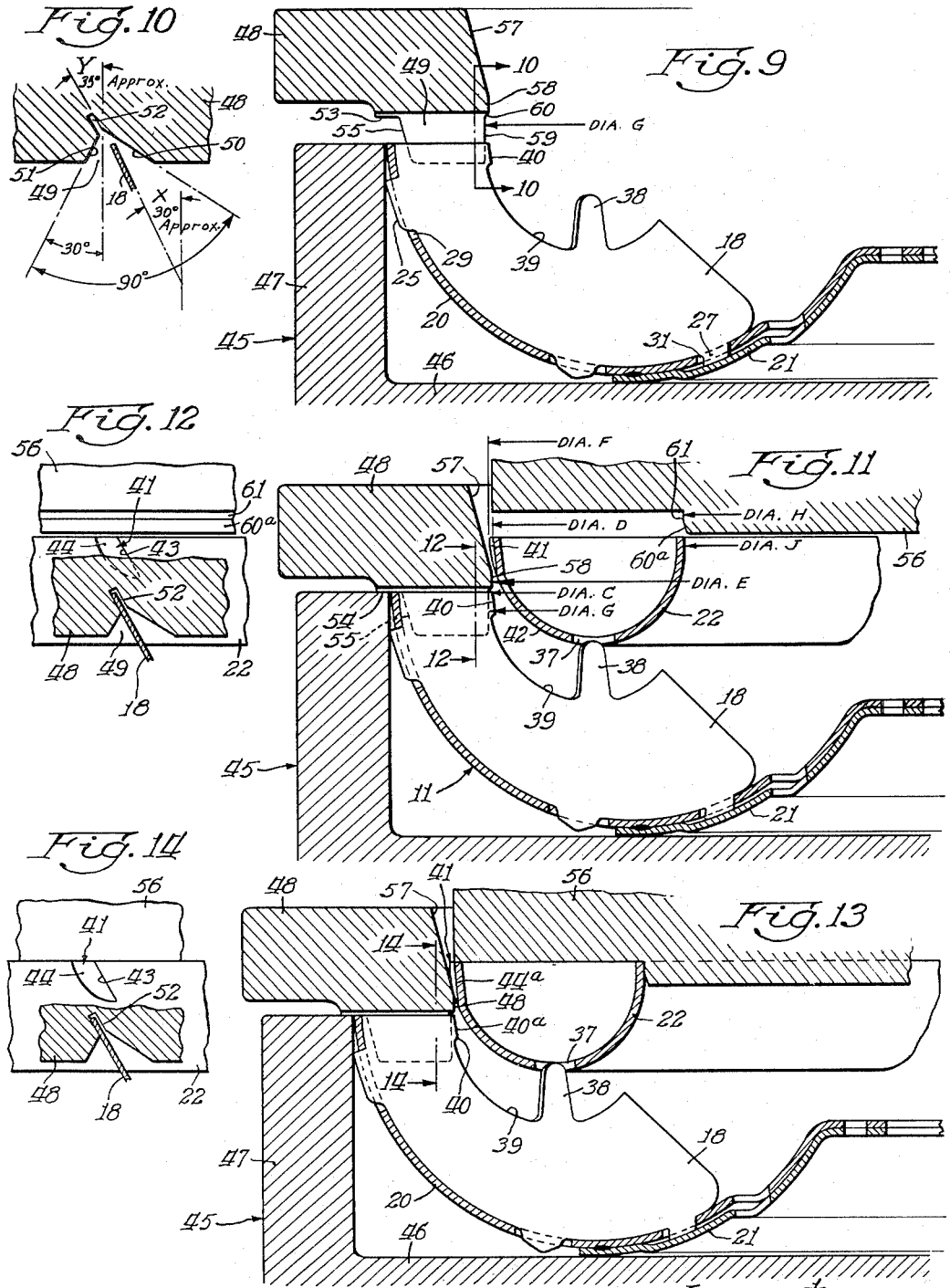

United States Patent Office 2,752,859
Patented July 3, 1956

2,752,859

FLUID COUPLING ELEMENT

Reinhold C. Zeidler, Detroit, Mich., assignor to Borg-Warner Corporation, Chicago, Ill., a corporation of Illinois Application August 19, 1949, Serial No. 111,103

14 Claims. (Cl. 103—115)

This invention relates to fluid couplings and, more particularly, to improved vaned elements of fluid couplings of the hydrodynamic type and to a method of and apparatus for assembling the vaned elements of the same. The present invention is directed to certain improvements of vaned elements of hydrodynamic fluid couplings, such as shown in my copending applications, Serial Nos. 68,691; 68,692; and 68,693, filed December 31, 1948, of which Serial No. 68,691 has become abandoned, and Serial No. 68,692 has matured into Patent No. 2,692,561, and Serial No. 86,693 has matured into Patent No. 2,692,562, the impeller and turbine vaned elements of the couplings comprising an outer semi-toroidal annular shell or casing, an inner semi-toroidal core ring, and a plurality of vanes between the shell and core ring, these component parts of the elements being formed as individual metal stampings and retained in assembly by novel means described in said applications.

An object of the invention is to provide improved vaned elements of fluid couplings and a new and novel method of and apparatus for assembling the same.

Another object of the invention is to provide improved vaned elements of a fluid coupling of the hydrodynamic or torque converting type and particularly the fabrication of the vanes and core ring and method of and apparatus for assembling the same, preventing separation of the vanes and core ring by the pressure of the circulating fluid in the couplings under the influence of engine torque and coast torque.

Another object of the invention is to provide improved fabricated vaned elements of a hydrodynamic fluid coupling involving novel interlocking connecting structure of the vanes and core ring insuring their assembly during operation of the fluid coupling.

Still another object hereof resides in providing an arrangement in a fluid coupling and the like wherein the vanes are provided with tabs received within openings intermediate the edges of the semi-toroidal core ring and, in addition, the vanes and core ring are provided with interlocking connections comprising small projections on the vanes received within notches in an edge of the core ring, the semi-toroidal core ring being capable of expansion and contraction to effect engagement of the notches with the projections on the vanes in a manner positively retaining the vanes and core ring in assembly during operation of the hydrodynamic coupling device.

Another object of the invention is to provide an arrangement whereby vanes and a core ring of a hydrodynamic coupling device as described may be quickly and effectively assembled by a simple operation involving a novel method of and apparatus for assembling the core ring on the vanes.

Additional objects, aims and advantages of the invention contemplated herein will be apparent to persons skilled in the art after the construction and assembling of the present fabricated hydraulic torque-transmitting device or fluid coupling is understood from the within description. It is preferred to accomplish the numerous objects of this invention and to practice the same in substantially the manner hereinafter fully described and as more particularly pointed out in the appended claims. While the improvements are herein disclosed in a fluid coupling, such as above referred to, the instrumentalities for practicing this invention are applicable for use in a variety of types of mechanisms and, therefore, are not to be confined to the particular use herein explained.

Reference is now made to the accompanying drawings that form a part of this specification, wherein:

Fig. 1 is an axial section of a fragmentary portion, preferably the upper half, of the vaned elements of a hydraulic torque-transmitting device.

Fig. 2 is an enlarged side elevational view of the vaned turbine element of the device shown in Fig. 1 and as seen from the right in Fig. 1.

Fig. 3 is a sectional view taken on line 3—3 of Fig. 2.

Figs. 4 and 5 illustrate the design and curvature of the vanes of the turbine element illustrated in Figs. 1 and 2, Fig. 4 being a side elevation thereof and Fig. 5 being a view taken on the line 5—5 of Fig. 4.

Figs. 6, 7 and 8 illustrate one or more of the vane-receiving notches in the core ring of the turbine element of Figs. 1 and 2, before assembly of the vanes and core ring.

Figs. 9 to 16, inclusive, are views illustrating a preferred form of equipment and the various steps for connecting the core ring to the vanes of the vaned turbine element shown in Figs. 1 and 2; Fig. 9 being an axial sectional view illustrating the outer shell and vanes of the turbine element in assembled relation, the assembly being mounted in a holder and the vanes having a positioning and guide fixture disposed thereabove; Fig. 10 being a sectional view taken on line 10—10 of Fig. 9 illustrating a vane prior to reception in the fixture; Fig. 11 being a view similar to Fig. 9 and illustrating the fixture holding the vanes in predetermined positions and showing the core ring and a pressure plate, the latter being positioned to effect engagement of the core ring with the vanes; Fig. 12 is a sectional view taken on line 12—12 of Fig. 11 showing a vane engaged by the fixture and prior to reception in a notch in the core ring; Fig. 13 is another view similar to Fig. 11 but illustrating the further step during the assembling of the core ring wherein the core ring is engaged with the pressure plate and the fixture; Fig. 14 being a sectional view taken on line 14—14 of Fig. 13; Fig. 15 being a view illustrating the vanes within the notches in the core ring and the core ring connected to the vanes; and Fig. 16 is a sectional view taken on the line 16—16 of Fig. 15.

Figs. 17, 18 and 19 illustrate a fragmentary portion of the annular positioning and guide fixture of the equipment, Fig. 17 being a face view thereof, Fig. 18 being a section taken on line 18—18 of Fig. 17, and Fig. 19 being an enlarged section of a portion thereof.

The drawings are to be understood as being more or less of a schematic character for the purpose of disclosing a typical or preferred form of the improvements which are contemplated herein, but in these drawings like reference characters identify the same parts in different views.

Referring now to a detailed description of the improved fluid coupling shown in Fig. 1 of the drawings, the fluid coupling there shown is of the hydrodynamic type including an impeller generally indicated at 10, a runner or turbine indicated at 11, and a stator indicated at 12, the impeller 10 including a semi-toroidal shell 13 having at its outer edge a flange 14 adapted to be secured to an engine to effect the rotation of the impeller to create a toroidal circulation of fluid in the coupling device effective to propel the runner or turbine 11 and thereby a driven shaft (not shown) through the medium of a hub 15, the stator 12 being effective to control the toroidal circulation of fluid in combination with the curvature design of the vanes 17 and 18 of the impeller and runner, respectively, to effect a controlled conversion of the torque from the engine to the driven shaft.

The component parts of the impeller 10 are the shell 13, vanes 17, and core ring 19; the runner 11 comprises the semi-toroidal shell indicated at 20 and reinforcing member 21, vanes 18 and core ring 22; the stator 12 comprising the annular arcuate shell 23 and vanes 24, these parts of the respective vaned elements being preferably formed of sheet metal stampings with each of the impeller, runner and stator component parts being retained in assembly by interlocking mechanical connections. The aforesaid component parts of the various vaned elements of the hydrodynamic coupling are more fully illustrated and described in my aforesaid application, Serial No. 68,691, now abandoned, and reference may be made thereto for further details of design, construction and assembly of the impeller and stator.

Referring now, more particularly, to the runner 11, the construction of its parts and their assembly with each other, the vanes 18 are arcuate or substantially semi-circular in side elevation as shown in Figs. 1 and 2, and its outer arcuate edge engages the inner surface of the shell 20. Each vane 18 is provided with three spaced tabs 25, 26 and 27 on its outer arcuate edge 28 received within slots 29, 30 and 31 in the shell 20, the tab 27 being bent over to engage the outer surface of the shell 20. The shell 20 and its engaging reinforcing member 21 have radially inwardly directed flanges 32 at their inner peripheries which are suitably secured by rivets 33 to the hub flange 34 of the hub 15. In the assembly of the vanes with the shell 20, each of the vanes, which are of curved configuration as shown in Figs. 4 and 5 and comprise flexible sheet metal stampings, is flexed to position the tab 25 thereof within the opening 29 in the shell 20, tab 26 into opening 30 and the tab 27 in the opening 31 of the shell 20, the openings 29, 30 and 31 being more elongated than the tabs 25, 26 and 27 to receive the same. Release of the flexed vane causes the tabs 25 and 27 to frictionally engage the shell at the points indicated at 35 and 36, the tab 27 then being bent over to engage the outer surface of the shell 20 to fix the vanes 18 to the shell 20. The vane thus assembled is under a compression loading or preloaded which prevents it from rattling or vibrating. The foregoing construction of the vanes 18 and shell 20 and their assembly are more particularly described in my aforementioned copending application, Serial No. 68,692 now Patent No. 2,692,561.

The present invention is more particularly directed to the construction of a core ring and vanes of a vaned element of a hydrodynamic coupling device for assembly with each other and the method of and apparatus for assembling the same, and wherein the core ring is preferably formed as a sheet metal stamping and is to some degree flexible. For purposes of disclosing the invention, reference is made to the construction and assembly of the core ring and vanes of the runner 11, the core ring is shown as being of semi-toroidal shape and formed of a steel stamping having a plurality of circumferentially spaced slots 37 intermediate the radially inner and outer edges thereof for receiving tabs 38 on the inner arcuate edges 39 of the vanes 18. In addition, each of the vanes has its inner arcuate edge 39 provided with a projection or tab 40, the tabs 40 being received within notches 41 formed in the outer surface 42 of the core ring at the radially outer edge thereof.

It is well known that, in hydrodynamic couplings of the vaned type described, it is imperative that the vanes of the impeller, runner and stator be securely held with their curvatures in predetermined relationships in order that satisfactory torque multiplication ratios and maximum efficiency be obtained inasmuch as the curvatures of the vanes are effective to control the toroidal circulation of fluid in the coupling to provide variable torque multiplication ratios. Accordingly, the curvatures of the vanes in the impeller, runner and stator must be calculated by involved hydraulic principles involving complex mathematical formulae to predetermine their most satisfactory curved characteristics of the vanes for obtaining the proper variable torque multiplication ratios, and it is then required that the vanes must be positively fixed to the outer shells of the vaned elements, and the core rings of the impeller and stator to prevent variations in the curvatures of the vanes.

As previously described, the impeller 10 is rotated at high speed by the engine with the effect that the fluid circulates in toroidal paths through the passages defined by the vanes of the vaned elements of the hydrodynamic coupling and in a direction indicated by the arrow in Fig. 1. The fluid leaving the impeller is forcibly passed into the passages in the runner 11 defined by the vanes and the outer shell and inner core ring, and the end portions of the vanes of the runner disposed adjacent the exit of the impeller are subjected to considerable stress and strain by the impact of the fluid striking against the sides of the vanes of the runner, and, accordingly, it is also necessary that the portions of the vanes of the runner at the fluid entrance of the runner must be securely held in assembly with the outer shell and core ring of the runner not only to prevent disconnection of the same but also to prevent rattle and vibration and to maintain the curvatures of the vanes in their predetermined desired locations with respect to the vanes of the impeller 10 and the vanes of the stator 12.

Hence, in the fabrication of hydrodynamic coupling devices embodying vaned elements of the type described, it is important that the vanes be securely connected to the outer shells and, in the case of the impeller and runner, also to the core ring, and be sufficiently preloaded so that no movement of the vanes relative to outer shells and core rings of the vaned elements is had during operation of the coupling device. In the present runner construction, the outer peripheries of the vanes are securely held in a preloaded condition to the outer semi-toroidal shell to prevent any relative movement between these parts. The core ring and vanes are constructed for attachment and are connected in a manner such that the core ring securely holds the inner edges of the vanes from relative movement with respect to the core ring and induces an additional preloading force in the vanes to further frictionally dampen and prevent vibrations. The semi-toroidal annular outer shell and inner core ring thus effectively hold the vanes with their curvatures disposed in the desired relationship.

In the present arrangement, the before-mentioned assembly of the vanes of the runner 11 and the outer shell 20 of the runner 11 effectively anchor the adjacent portions of the vanes against displacement and, as will now be described, the projections 40 in the notches 41 securely hold the adjacent portion of the vanes against relative movement with respect to the core ring, so that the vanes cannot move relative to the shell 20 and core ring 22 during operation of the hydrodynamic coupling. Referring to the latter connection, shown in Figs. 2 and 16, the impeller 10 causes the fluid to flow with considerable force into the passages between the vanes 18 of the runner 11 due to the large engine torque exerted on the impeller 10, the fluid being forcibly expelled from the impeller 10 and striking against the sides of the vanes indicated at Q in Figs. 2 and 16. Movement of the vanes relative to the core ring is prevented by the construction and arrangement of the connection between the vanes and core ring. More particularly, referring to Figs. 6, 7, 8, and 16, each of the notches 41 in the radially outer edge of the core ring is defined by two flat surfaces 43 and 44 approximately at right angles and parallel to each other. Line 44a is caused by the intersection of surface 44 with the compound curvature of the outer surface 42 of the core ring. The notch is diagonally disposed in such a manner that surface 43, hereafter called the shoulder, is approximately 35° to a line perpendicular to the normal plane of the core ring, while surface 44, hereafter called the bottom, lies at an angle of approximately 11° with a line tangential to the outer diameter and also slopes at an angle of approximately 7½° with a line parallel to the axis. Projection of this bottom surface would cause convergence at a point opposite the open side of the core ring. This is shown in Figs. 6, 7, 8, and 16. The angles mentioned are not necessarily the exact ones that would be used, as they will vary with the angle required in the vane and with the number of vanes used. They are mentioned merely to give a better understanding of the angular disposition of the notch as a whole. In production manufacture the notches would be produced in one operation of a press by having a cam-operated die with as many radially disposed punches as there are notches. If the punches were designed to move in radially, the end doing the forming would have two surfaces at right angles and parallel to each other but at a compound angle to produce the notch described above. The angle of 7½° of the bottom is to help the vane tab 40 enter the notch. The angle of 35° of the shoulder is about 5° more than the angle in this part of the vane when the vane is assembled in the shell 20 prior to assembly of the core. Thus, when the core ring is in position, it imparts about 5° more angle at the inner edge of the vane producing a preload in the vane which causes it to abut the shoulder 43 firmly. The angle of 11° of the bottom together with friction caused by the radial expansion force of the core ring, to be described later, is more than sufficient to prevent the vane from leaving the shoulder 43 or vibrating under conditions of reverse flow, such as when coasting or using the engine for downhill braking.

In the event the engine torque is released with consequent deceleration of the impeller and the driven shaft attached to the runner 11 rotates faster than the impeller 10, fluid will be impelled against the vanes 18 of the runner in the direction indicated at R in Figs. 2 and 16, but the angular formation of the tapered surface of the notches in the core ring will prevent the projections of the vanes from sliding upwardly thereon due to the friction set up between the projections of the vanes and these tapered portions of the notches of the core ring, even under large coast torque loads; as, for example, when going down a steep hill with the engine accelerator released, the driven shaft and runner 11 will rotate considerably faster than the engine and impeller 10. The considerable friction set up by the engagement of the projections on the vanes with the tapered portions of the notches of the core ring will positively prevent the projections from riding up the tapered portions of the notches and out of the notches. In Fig. 10, the angle Y corresponds to the angle of the notch 41 in the core ring and is approximately 5° larger than the angle X in the vane to provide a frictional engagement and preloading between the projections on the vanes and the notches in the core ring to prevent vibration and rattle of the vanes. The aforesaid connection between the projections of the vanes and notches of the core ring is provided by the novel method of and apparatus for assembling the core ring with the vanes of the runner in a manner which will now be described.

Referring, more particularly, to Figs. 9 to 18, inclusive, the outer shell of the runner 11 and the vanes 18 are initially assembled as described and thereafter the assembled outer shell and vanes are positioned within a cylindrical bed plate 45 of a press as shown in Figs. 9, 11, 13, and 15, said bed plate having a bottom wall 46 with the flat inner surface thereof engaging the reinforcing plate 21 of the outer shell of the runner and said bed plate having a cylindrical wall 47 surrounding and receiving therewithin the vane and outer shell assembly, with the upper interior portion of the wall 47 engaging the radially outermost extremity of the outer shell 20 to align the axes of the shell 20 and bed plate and to position the assembly against movement.

A vane-locating and core ring-positioning plate 48 of annular shape is then utilized to hold the vanes correctly spaced from each other and with their curvatures in desired positions. More particularly, the plate 48 is provided with a series of indentations or grooves 49 in one side face thereof, with each indentation having angularly disposed walls 50 and 51 (Figs. 10, 17 and 18), the walls 50 and 51 of each groove being disposed at an angle of approximately 90° in the present case. The bottom of each indentation 49 in the plate 48 is provided with a slot 52 for reception of a vane 18 so that the side walls 50 and 51 of the indentation are effective to guide the adjacent edge of the vanes along their surfaces and into the slot 52 which is disposed at an angle of 35° to the plane of the plate to be effective to securely hold the vanes with their curvatures in the correct desired positions and with relationship to each other, as shown in Figs. 9 and 10, wherein the positioning plate is shown being lowered for engagement with the vanes. It will be noted the vanes will enter the indentations in the plate and will be guidingly engaged by one or the other side walls 50 or 51 of the indentations 49. Thus, the plate is angularly positioned by its engagement with the vanes. During the stage of the vanes first entering the slots until they are fully engaged, the plate is rotated a small amount.

In Figs. 11 and 12, the plate 48 is shown in its final vane-engaging position, wherein the vanes have entered into the slots 52 in the plate and are being held with their curvatures in the correct desired positions. As shown in Figs. 9, 11 and 18, the plate 48 is provided with an angularly disposed or conical outer surface 55 in the grooved portion thereof to provide a self-centering arrangement for the plate during the positioning of the plate on the bed plate, the angularly disposed surface 55 engaging the radially outer extremity of the outer shell of the runner during positioning of the plate on the bed plate and the vanes within the indentations in the plate 48. It may be noted that, at this time, the plate is positioned with its flat area 53 radially outward of the grooved portion thereof in engagement with the top of the cylindrical wall of the bed plate as indicated at 54, thus holding the assembled outer shell and vanes of the runner in firm engagement with the bed plate 45 while maintaining the vanes in their correct position.

The interlocking connections between the core ring and vanes are performed by a single operation, after positioning of the core ring as shown in Fig. 11 as described and thereafter utilizing a pressure plate indicated at 56 to urge the core ring toward the vanes and the projections on the vanes into the notches of the core ring in a manner which will now be described and as indicated in the steps shown in Figs. 11 to 15, inclusive.

It may be noted that, from a consideration of Figs. 11 and 13, the positioning plate is provided with a circumferential conical inner surface 57 tapering from the top to substantially the bottom of the plate to serve as a guide for centering the axis of the core ring with respect to the axis of rotation of the runner. Referring to Figs. 9 and 11, it is important that the engaging portions of the pressure plate 56, the core ring, the positioning plate 48, and the projections 40 on the vanes have certain diametrical dimensions, to be described, in order to provide certain advantageous and desirable features in the assembled runner. More particularly, the diameter F of the core ring is the edge defining the radially outer surface of the core ring, and the diameter F is greater than the diameter E of the small cylindrical portion, indicated at 58, defining an inner surface of the positioning plate 48 as is clearly shown in Fig. 11, so that when the pressure plate 56 is urged downwardly, it will force the outer edge of the core ring into engagement with the surface 57 and thereafter with the surface 58 to contract the core ring. The diameter D of the core ring indicates the bottom of each notch 41 in the core ring, and this diameter is larger than the diameter C of the assembly taken at the top edge portions of the projections 40 of the vanes so that, upon further downward movement of the core ring, the projections 40 of the vanes will readily enter into the notches 41 in the core ring. The diameter F, indicating the radially outermost edge of the core ring, is approximately the same as the diameter G taken from the cylindrical radially inner surface 59 of the positioning plate 48 and which is spaced from the surface 57 of the positioning plate by a shoulder 60 (Figs. 18 and 19), and the diameter G is greater than the diameter E as will be apparent from examination of Figs. 9 and 11. In view of the foregoing various diameters of the specified surfaces of the positioning plate, core ring and vanes, it will be apparent that the core ring will be contracted by the engagement of its radially outer edge with the surfaces 57 and 58 of the positioning plate and which feature is effective to avoid a scrubbing action, during engagement of the projections on the vanes with the edge of the core ring, which might possibly shear the projections during the forcible downward movement of the pressure plate and core ring. It may be noted that the pressure plate 56 is provided with a sloping surface 60a engageable with the radially inner edge of the core ring to locate the pressure plate within the core ring, the tapering surface 60a merging with a cylindrical surface 61 of the pressure plate which has a diameter H approximately the same as the diameter J of the radially inner edge of the core ring, so that the only pressure exerted by the pressure plate on the core ring is in an axial direction.

After the core ring is contracted, the edge of the core ring indicated by the diameter F will slide past the shoulder 60 of the plate 48 and is allowed to expand to engage the projections 40 of the vanes received within the notches in the core ring. It may be noted that, inasmuch as the diameter G defined by the surface 59 of the positioning plate is approximately the same as the diameter F of the core ring, the core ring can expand to engage the projections on the vanes, as indicated clearly in Figs. 15 and 16. It may be noted from an inspection of Fig. 19, showing a fragmentary enlarged section of the core-engaging surfaces 58, 60b, and 59 that the surface 60b is tapered and is disposed at an angle of 30° with respect to a radial plane of the annular positioning plate so that the outermost edge of the core ring will slide along the surface 60b to allow expansion of the core ring in a smooth manner when the projections on the vanes are located within the notches 41 in the core ring, whereby interlocking engagement will be had between the projections on the vanes and the notches in the core ring after the core ring has its outer semi-toroidal surface engaged with the inner arcuate surfaces of the vanes.

Figs. 12 and 14 illustrate the relationship of the vane 18 with respect to notch 41 prior to insertion of the projections 40 within the notches. The alignment necessary between the projections and the notches is obtained by the prior partial engagement of the tabs 38 with slots 37 in the core ring. The core ring is positioned so that each of tabs 38 enter slots 37 before the pressure plate is put in place and pressure applied. As the core ring is pressed into place, it is angularly positioned by the engagement of tabs 38 with slots 37. It contracts as it passes through diameter E and about when its surface 42 bottoms on the edges 39 of the vanes, it has passed through diameter E and expanded exerting a substantial radial force between the bottom surface 44 of the notch and the edge 40a of the projections. The shoulder 43 provides a positive abutment in the driving direction, while the combination of the tangential angle of the bottom of the slot with the heavy radial force set up by the core ring causes sufficient friction to prevent the vane from moving away from the shoulder 43 under reverse torque conditions. After the outer curved surface of the core ring is engaged with the inner arcuate edges 39 of the vanes and the projections of the vanes are disposed within the notches in the core ring, the tabs 38 are then bent downwardly at an angle to the vanes for engagement with the inner semi-toroidal surface of the core ring to complete the assembly of the core ring with the vanes.

It will be apparent from the foregoing description of my improved vaned element for a hydrodynamic coupling device and to a method of and apparatus for assembling the same that I have provided a vaned element having the component parts thereof connected in a manner which will satisfactorily withstand the pressures of the fluid circulating in the hydrodynamic coupling device during operation thereof. It will be apparent that, while I have described a vaned runner element of a hydrodynamic coupling device in disclosing my invention, the invention is equally applicable to other vaned elements of the hydrodynamic coupling device, such as fabricated impellers embodying core rings, for example, the impeller 10. While this invention has been described in detail in its present preferred form or embodiment, it will be apparent to persons skilled in the art, after understanding the improvements, that various changes and modifications may be made therein without departing from the spirit or scope thereof. It is, therefore, aimed in the appended claims to cover all such changes and modifications.

I claim:

1. In a vaned element of a fluid coupling, the combination of a semi-toroidal casing; substantially semi-circular vanes in said casing provided with radially inner and outer edges and having their radially outer arcuate edges secured to said casing; a semi-toroidal flexible core ring; and spaced means connecting the inner arcuate edges of said vanes to said core ring, one of said means fixing portions of said vanes to said core ring and the other of said means comprising abutting portions of said vanes and core ring positively preventing lateral movement of other portions of the vanes relative to said core ring in one direction and frictionally engaging each other for resisting lateral movement of said other portions of the vanes relative to the core ring in the opposite direction, said abutting portions comprising edges of said vanes received within tapered recesses in said core ring and engaging surfaces of said recesses with a wedging action by flexure of the core ring.

2. In a vaned element of a fluid coupling, the combination of a semi-toroidal casing; substantially semi-circular vanes in said casing and having radially inner and outer arcuate edges with their radially outer arcuate edges secured to said casing; a semi-toroidal core ring having a semi-toroidal outer surface and slots in said outer surface; and means connecting the inner arcuate edges of said vanes to said semi-toroidal surface of said core ring, said means comprising projections on the inner arcuate edges of said vanes received within said slots in said core ring, each of said slots being a tapered recess defined solely by a wall portion extending generally radially of the core ring and a surface portion sloping toward and terminating at the radially inner end of said wall portion and being disposed at an acute angle to the wall portion with the wall portion and sloping surface portion of each slot providing a wedging action on the vane projection received therein and the wall portion of each slot engaging one side of the projection received within the slot to positively prevent lateral movement of portions of the vane relative to the core ring in one direction and the sloping portion of each slot, adjacent the wall portion thereof, engaging the end of the projection within the slot to frictionally resist lateral movement of said portions of the vanes relative to the core ring in the opposite direction.

3. In a vaned member of a fluid coupling, the combination of a semi-toroidal casing element; and a semi-toroidal core ring element; substantially semi-circular vanes in said casing element secured to one of said elements and engaging the other of said elements, said casing element, vanes and core ring element defining fluid passages in said vaned member, and means securing said vanes to said other element including projections on said vanes and tapered slots in said other element, said projections being received within said tapered slots in said other element at the fluid entrances of the passages of said vaned member, each of said tapered slots being formed with a generally radially extending wall portion and with a surface portion sloping radially inwardly toward said wall portion and affording a wedging action with said wall portion on said projections to positively prevent lateral movement of said vanes relative to said other element in one direction and to frictionally resist lateral movement of the vanes relative to said other element in the opposite direction.

4. In a vaned element of a fluid coupling, the combination of a semi-toroidal casing; a semi-toroidal core ring having slots therein; substantially semi-circular vanes in said casing and engaging said casing and core ring, and having projections extending therefrom; means securing said vanes to said casing; and means securing said vanes to said ring including said projections on said vanes received within said slots in said core ring, said core ring being a flexible metal stamping contractible to position said projections on said vanes within the slots in said core ring and expansible to engage the projections on said vanes with the core ring by engaging the surfaces of the slots in the core ring.

5. In a vaned element of a fluid coupling, a substantially semi-toroidal casing; a substantially semi-toroidal core ring having tapered slots in the outer surface thereof adjacent an edge thereof; a plurality of arcuate flexible curved vanes between said casing and core ring and having curved inner and outer edges with each vane having projections extending from one end of the inner edge thereof; means securing said vanes to said casing; and means connecting said vanes and said core ring and including said projections received within said tapered slots in the outer surface of said core ring, each of said tapered slots having a wall portion lying generally at a right angle to a line perpendicular to the normal plane of the core ring and engaging the received projection of a vane to positively prevent movement of the portion of the vane, adjacent the core ring, relative to the core ring in one direction, each of said tapered slots being further defined by a portion thereof sloping radially inwardly toward the radially inner end of the wall portion thereof and engaging the end of the received projection for frictionally preventing movement of the said adjacent portion of the vane relative to the core ring in the opposite direction, said wall and surface portions of said slot exerting a wedging action on said projection, the wall portion of each of said tapered slots being disposed at an angle to the side of the associated projection engaging the same and the sloping portion of each slot engaging the end of the associated projection to flex the adjacent portion of the vane to effect a desired predetermined curvature thereof.

6. In a vaned element of a fluid coupling, the combination of a semi-toroidal casing; a semi-toroidal core ring having tapered recesses therein; substantially semi-circular vanes in said casing and engaging said casing and core ring; means securing the vanes to the casing; means securing said vanes to the core ring; including a connection between each vane and said core ring provided by a first generally radially extending surface of a recess in said core ring engaging one of the sides of said vanes to prevent lateral movement thereof in one direction and a second surface of a recess sloping and terminating at the radially inner end of said first surface and frictionally engaging the edge of said vane to prevent lateral movement of said vane in the opposite direction, said surfaces exerting a wedging action on said vane to maintain the adjacent portion of the engaged vane flexed to provide a predetermined desired curvature of the adjacent portion of the vane.

7. In a vaned element of a fluid coupling, the combination of a semi-toroidal casing; a semi-toroidal core ring having slots therein; substantially semi-circular vanes in said casing and engaging said casing and core ring and having tabs projecting therefrom; means securing the vanes to the casing; and means securing said vanes to the core ring including said tabs on said vanes received within slots in said core ring providing each slot of said core ring including a tapered recess having a first generally radially extending surface engaging one of the sides of the tab received therein to prevent lateral movement thereof in one direction and a second surface sloping radially inwardly toward and terminating at said first surface and forming an acute angle therewith and frictionally engaging the edge of the vane tab to prevent lateral movement of said vane in the opposite direction, said core ring being formed of a flexible material and being placed under compression to exert a wedging action of said slots on said projections to maintain said slots in the core ring and the tabs on the vanes in cooperative relationship.

8. The method of fabricating a vaned element of a fluid coupling having a semi-toroidal shell, a contractible and expansible semi-toroidal core ring having notches in its outer surface adjacent one edge thereof, and a plurality of arcuate vanes secured to said shell and each having a projection on its inner arcuate surface at one end thereof comprising the steps of holding said one end of the vanes in predetermined positions, positioning the core ring concentric to the axis of the shell, moving the core ring toward the vanes, contracting the core ring during movement of the core ring to enter projections on the vanes in the notches in the core ring and thereafter permitting expansion of the core ring to engage the projections on the vanes with the surfaces of the notches in the core ring.

9. The method of fabricating a vaned element of a fluid coupling having a semi-toroidal shell, a contractible and expansible semi-toroidal core ring having notches in its outer surface substantially parallel to the axis thereof, and a plurality of arcuate flexible vanes each having a projection on its inner arcuate surface at one end thereof, comprising the steps of connecting the vanes to the shell to provide a sub-assembly, mounting the sub-assembly in a holder, holding the said ends of the vanes in flexed condition to obtain a predetermined desired curvature thereof and to prevent relative movement thereof, positioning the core ring with its axis concentric to the axis of the sub-assembly to align the projections on the vanes with the notches in the core ring, moving the core ring toward the sub-assembly, and contracting the core ring during movement of the core ring to enter the projections of the vanes in the core ring and thereafter permitting expansion of the core ring to engage the projections of the vanes with the notches in the core ring to fixedly secure the core ring and vanes together and to hold said ends of the vanes flexed with the desired curvatures.

10. The method of fabricating a vaned element of a fluid coupling having a semi-toroidal shell, a contractible and expansible semi-toroidal core ring having seats on its outer surface adjacent one edge thereof, and a plurality of arcuate vanes secured to said shell and each having a mounting portion on its inner arcuate surface at one end thereof comprising the steps of positioning the core ring concentric to the axis of the shell, moving the core ring toward the vanes, contracting the core ring during movement of the core ring to position the mounting portions of the vanes adjacent the seats of the core ring and thereafter permitting expansion of the core ring to engage the mounting portions of the vanes and the seats of the core ring.

11. The method of fabricating a vaned element of a fluid coupling having a semi-toroidal shell, a contractible and expansible semi-toroidal core ring having seats on its outer surface, and a plurality of arcuate flexible vanes each having a mounting portion on its inner arcuate surface at one end thereof, comprising the steps of connecting the vanes to the shell to provide a sub-assembly, mounting the sub-assembly in a holder, holding the said ends of the vanes in flexed condition to obtain a predetermined desired curvature thereof and to prevent relative movement thereof, positioning the core ring with its axis concentric to the axis of the sub-assembly to align the mounting portions of the vanes with the seats of the core ring, moving the core ring toward the sub-assembly, and contracting the core ring during movement of the core ring to position the mounting portions of the vanes adjacent the seats of the core ring and thereafter permitting expansion of the core ring to engage the mounting portions of the vanes and the seats of the core ring to fixedly secure the core ring and vanes together and to hold said ends of said vanes flexed with the desired curvatures.

12. The method of fabricating a vaned element of a fluid coupling having a substantially semi-toroidal shell, a substantially semi-toroidal flexible core ring, and arcuate vanes, comprising the steps of providing a sub-assembly of the shell and vanes, providing interengageable portions on said vanes and core ring, positioning the shell and core ring with their axes in alignment, moving the core ring and shell toward each other, contracting the core ring during relative movement of the shell and core ring to position the interengageable portions of the core ring and vanes adjacent each other, and thereafter permitting expansion of the ring to engage the interengageable portion of the core ring and vanes.

13. The method of fabricating a vaned element of a fluid coupling having a substantially semi-toroidal shell, a contractible and expansible substantially semi-toroidal core ring, and a plurality of substantially semi-circular vanes, comprising the steps of providing a sub-assembly of the shell and vanes, positioning the shell and core ring with their axes in alignment, moving the core ring and shell toward each other, contracting the core ring during relative movement of the shell and core ring to position the core ring adjacent the inner arcuate edges of the vanes and thereafter permitting expansion of the ring to fixedly engage the core ring and vanes.

14. A fixture for use in assembling a substantially semi-toroidal core ring to the vanes of a sub-assembly of the vanes and a shell of a fluid coupling element comprising an annular member having slots at one side thereof engageable with the vanes for positioning the vanes in predetermined relation to each other, a conical surface on its inner circumferential portion adapted to guidingly engage the core ring and to contract the core ring, another conical surface having its portion of least diameter adjacent the portion of least diameter of said first conical surface to permit the gradual expansion of said core ring, and a substantially cylindrical surface on its inner circumferential portion and terminating at the portion of greatest diameter of said second conical surface, said substantially cylindrical surface being adapted to be disposed within the vanes of the sub-assembly adjacent said slots and having a larger diameter than the second conical surface to permit full expansion of the core ring to engage the core ring and the vanes.

References Cited in the file of this patent

UNITED STATES PATENTS

| | | |
|---|---|---|
| 903,532 | Anderson | Nov. 10, 1908 |
| 1,876,518 | Mathis | Sept. 6, 1932 |
| 1,890,226 | Mathis | Dec. 6, 1932 |
| 2,000,276 | Delaval-Crow | May 7, 1935 |
| 2,031,521 | Baumann et al. | Feb. 18, 1936 |
| 2,061,997 | Dunn | Nov. 24, 1936 |
| 2,074,170 | Dunn | Mar. 16, 1937 |
| 2,219,339 | Small et al. | Oct. 29, 1940 |
| 2,313,105 | Walls | Mar. 9, 1943 |
| 2,336,231 | Dodge | Dec. 7, 1943 |
| 2,357,139 | Seme | Aug. 29, 1944 |
| 2,357,295 | Thomson | Sept. 5, 1944 |
| 2,363,983 | Miller | Nov. 28, 1944 |
| 2,387,722 | Dodge | Oct. 30, 1945 |
| 2,396,735 | Leigh | Mar. 19, 1946 |
| 2,474,298 | Zeidler | June 28, 1949 |
| 2,505,820 | Zeidler | May 2, 1950 |
| 2,598,620 | Swift | May 27, 1952 |
| 2,599,461 | Koskinen | June 3, 1952 |
| 2,630,683 | Wemp | Mar. 10, 1953 |